(12) United States Patent
Chen

(10) Patent No.: US 6,775,521 B1
(45) Date of Patent: Aug. 10, 2004

(54) BAD FRAME INDICATOR FOR RADIO TELEPHONE RECEIVERS

(75) Inventor: Yue Chen, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 301 days.

(21) Appl. No.: 09/642,698

(22) Filed: Aug. 9, 2000

Related U.S. Application Data
(60) Provisional application No. 60/147,509, filed on Aug. 9, 1999.

(51) Int. Cl.[7] ............................................. H04B 17/00
(52) U.S. Cl. ................................ 455/67.11; 455/67.13; 455/296; 455/226.1; 375/346; 375/343; 375/340; 375/224; 375/226; 370/331
(58) Field of Search ............................ 455/296, 226.1, 455/226.2, 226.3, 67.11, 67.13, 67.14; 375/346, 343, 340, 224, 226–227, 150; 370/332–333

(56) References Cited

U.S. PATENT DOCUMENTS

| | | | | |
|---|---|---|---|---|
| 4,225,976 A | * | 9/1980 | Osborne et al. | 455/226.3 |
| 5,361,276 A | * | 11/1994 | Subramanian | 375/150 |
| 5,465,276 A | * | 11/1995 | Larsson et al. | 375/346 |
| 5,537,410 A | * | 7/1996 | Li | 370/465 |
| 5,557,639 A | * | 9/1996 | Heikkila et al. | 375/224 |
| 5,703,902 A | * | 12/1997 | Ziv et al. | 370/332 |
| 5,737,359 A | * | 4/1998 | Koivu | 375/133 |
| 5,757,851 A | * | 5/1998 | Saegusa | 375/316 |
| 5,793,805 A | * | 8/1998 | Nikides | 375/224 |
| 5,839,061 A | * | 11/1998 | Hendrickson et al. | 455/296 |
| 5,933,768 A | * | 8/1999 | Skold et al. | 455/296 |
| 6,021,385 A | * | 2/2000 | Jarvinen et al. | 704/219 |
| 6,157,830 A | * | 12/2000 | Minde et al. | 455/424 |
| 6,205,130 B1 | * | 3/2001 | DeJaco | 370/335 |
| 6,487,185 B1 | * | 11/2002 | Burton | 370/332 |
| 6,563,810 B1 | * | 5/2003 | Corazza | 370/335 |
| 6,658,235 B1 | * | 12/2003 | Tolmunen et al. | 455/67.13 |

* cited by examiner

Primary Examiner—William Trost
Assistant Examiner—Sharad Rampuria

(57) ABSTRACT

A method for identifying a bad GSM speed frame and simultaneously maintaining a frame erasure rate below a specified value. The method is based upon a joint use of four signal quality metrics: (1) frame CRC parity check; (2) estimated burst signal-to-noise ratio; (3) estimated frame bit error count; and (4) stealing flag values of a frame. Another feature includes providing an improved estimated burst signal-to-noise ratio.

20 Claims, 5 Drawing Sheets

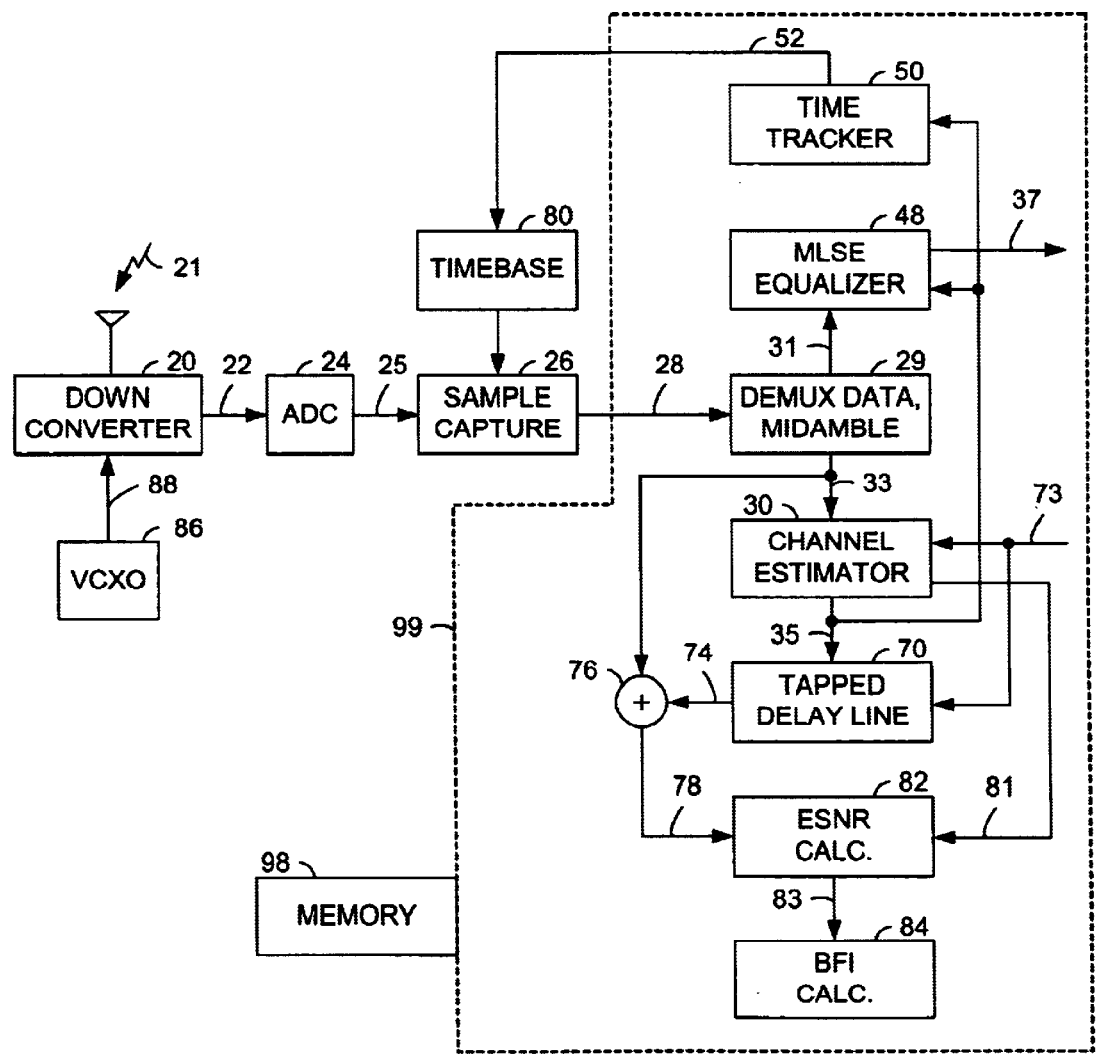
FIG. A-1

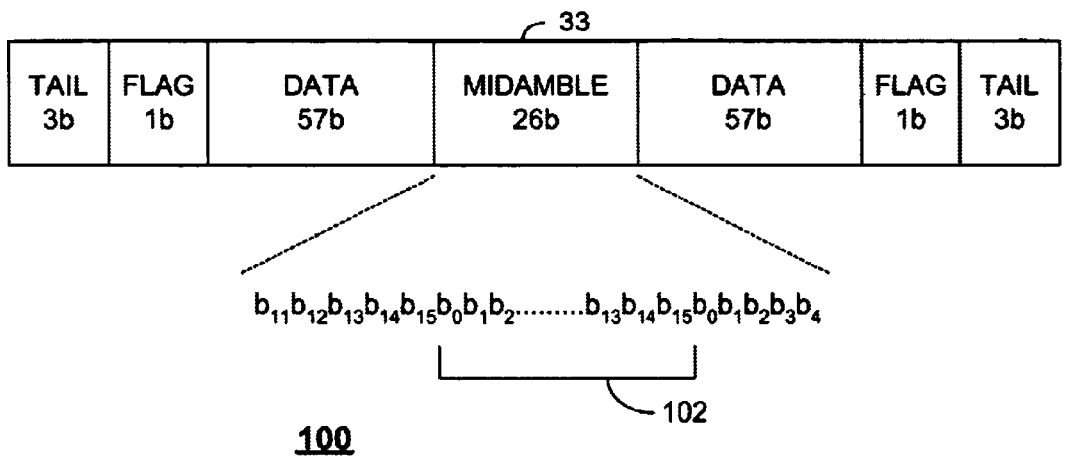
FIG. A-2
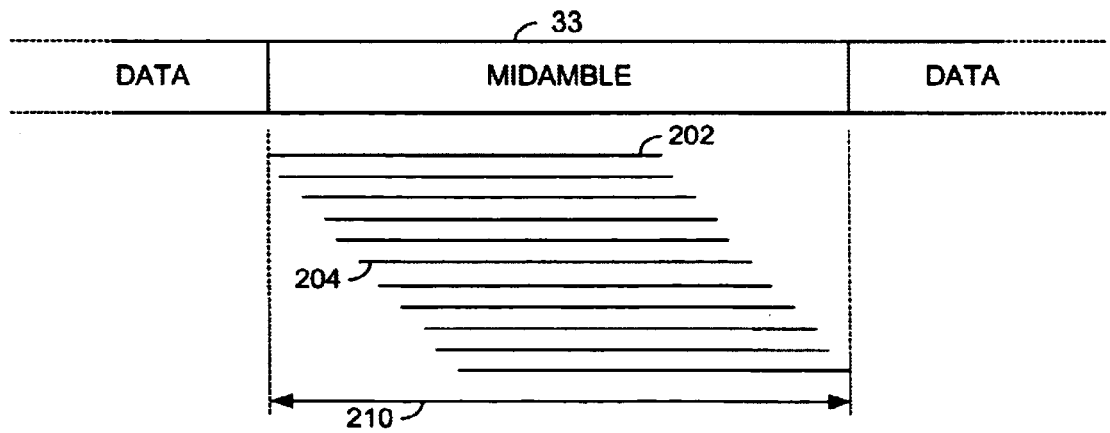
FIG. A-3

BAD FRAME INDICATOR FOR RADIO TELEPHONE RECEIVERS

This application claims priority benefit of provisional applcation 60/147,509 filed Aug. 9, 1999.

BACKGROUND OF THE INVENTION

The invention relates to error control in digital communication of speech data as in radio telephones. Bit errors occur in received speech frames due to communication channel disturbances. Error correction decoding of received speech frames is used to remove the bit errors prior to speech decoding of the speech frame. A speech frame that still contains residual bit errors after error correction decoding is termed a bad frame. If the bad frame is passed through the speech decoder unacceptable speech quality may occur due to distortions caused by the residual bit errors in the speech frame. To mitigate this problem received bad speech frames are identified as such prior to speech decoding by a binary bad frame indicator wherein a value of 1 signifies a bad frame. The speech decoder does not decode a bad frame but instead outputs previously decoded speech data or other substitute which is known to provide a more pleasant audio output than a decoded bad frame. The rate at which bad frames are indicated (BFI=1) is termed the frame erasure rate (FER). The GSM standard specifies stringent performance requirements for FER. The GSM requirement for BFI performance states that the number of undetected bad frames in a specified interval of time must be no greater than a specified number. Simultaneously, the GSM requirement states that the FER must be less than a specified number. In order to achieve an optimum compromise between these two opposing GSM requirements a bad frame criterion is needed.

In a conventional system, a cyclic redundancy code (CRC) is typically used to determine a bad frame. However, under the GSM standard, only a 3 bit CRC is provided which is a very weak code for identifying bad frames. A BFI indication based soley on the CRC cannot meet the GSM requirements for BFI and FER performance. In fact, the CRC may indicate no frame errors even though nearly half the frame bits are in error. This failure event can occur with non-negligible probability so that the CRC criterion alone does not suffice as a satisfactory BFI indicator.

SUMMARY OF THE INVENTION

Accordingly, the present invention utilizes four-signal quality metrics to specify the bad frame criterion. In addition to the frame CRC, the estimated signal to noise ratio (ESNR) for each of the 8 bursts comprising the frame, estimated bit error count (EBEC) for the frame, and stealing flag values for the frame are used. By using the four metrics jointly in a bad frame criterion, the present invention substantially improves decoded speech quality and provides an optimum compromise between the opposing GSM performance requirements for low false bad frame indication and maximum frame error rate. In addition to the frame cyclic redundancy check (CRC), the invention uses three novel signal quality metrics to detect the presence of speech frame errors. The first aspect of the invention for detecting frame errors is a method that uses estimated signal-to-noise ratio ESNR for each of the bursts comprising a speech frame to measure signal quality, e.g., four burst for the GSM system. Also, the present invention defines ESNR in a manner different from conventional practice in the art. The present invention defines ESNR as estimated signal power divided by estimated noise power. This ESNR can be obtained from the training sequence in a received TDMA burst. Under the GSM standard, the training sequence in a burst has 26 bits for synchronization. For the signal power measurement, the 26 received training sequence bits are correlated with a 16-bit local bit sequence selected from the 26 received training sequence. The optimal 16-bit local bit sequence is the central 16 bits of the whole 26 bit training sequence.

Then, 11 correlation values are obtained by a "sliding 16 bit" correlation of the 16 bits of the local sequence against 11 consecutive 16 bit sequences obtained by selecting 11 subsets of 16 consecutive bits contained in the 26 bits of the training sequence. Each 16-bit subset is offset from its nearest consecutive neighbor by one bit. The first correlation starts from the first bit position of the 26 bit training sequence. And the last ends with the last bit of the local sequence aligned with the last bit of the training sequence.

An integer number, L, is defined for embodiments of the present invention. For the GSM system L is defined as equal to 6. L absolute magnitude summations are formed from the L available L-bit consecutive sequences of the 11 correlation values obtained above. The maximum value of the L absolute magnitudes summations obtained is used as the estimated signal power. The choice of 11 correlation values is made for GSM system applications and the integer L being equal to 6 is selected to match the multi-path model for GSM systems, as is widely known.

It is also known that the L consecutive correlation values whose summation is the maximum, corresponding to the estimated signal power constitute the estimated channel impulse response. Next, the estimated received training sequence is obtained by convolving the local training sequence and the estimated channel impulse response. Convolution may be done in hardware or software, but is preferably performed in a commercially available DSP processor having sufficient processing power for the intended application, e.g., a chip or packaged device.

One novel feature of the present invention is the computation of an estimate for signal to noise ratio (SNR). Estimated noise power for the received channel is obtained by comparing the difference between the received training sequence and estimated received training sequence. Estimated signal-to-noise ratio (ESNR) for the present invention is computed by the ratio of Estimated noise power for the received channel and estimated received training sequence power. If any M ESNRs are less than a given threshold (SNRt) within the first four bursts or the last four bursts, then BFI=1 and otherwise BFI=0.

The second aspect of the invention for detecting frame errors is a method that uses stealing flags, normally generated by the GSM standard in combination with an estimated frame bit error count (EBEC). A summation is formed for the absolute value of 8 consecutive stealing flags detected in the received signal. When the absolute value of the summation of the 8 stealing flag values is less than a given threshold value, SFv, and EBEC is greater than a second threshold value, EBv, then the speech frame is declared to be bad frame, i.e., BFI=1. Taking the two aspects of frame error detection jointly the invention uses the following form of criteria for bad frame indication:

BFI=1 if any of the following conditions are true:
(1) CRC decoding indicates an error (parity failure);
(2) Three burst ESNRs are less than a threshold EBv among the first four bursts or among the last four bursts of a speech frame; or
(3) The absolute value of the sum of 8 stealing flags is within a value range [−y, +y] for some threshold value y, and the frame EBEC is greater than threshold EBv. Otherwise BFI=0.

FIG. A-1 shows a block diagram of a radio receiver 10 for a burst digital communication.

FIGS. A-2 and A-3 illustrate the basic format of the burst data of a GSM international cellular phone standard [European Telecommunication Standard GSM5.02].

DETAILED DESCRIPTION OF THE INVENTION

Figure 1:
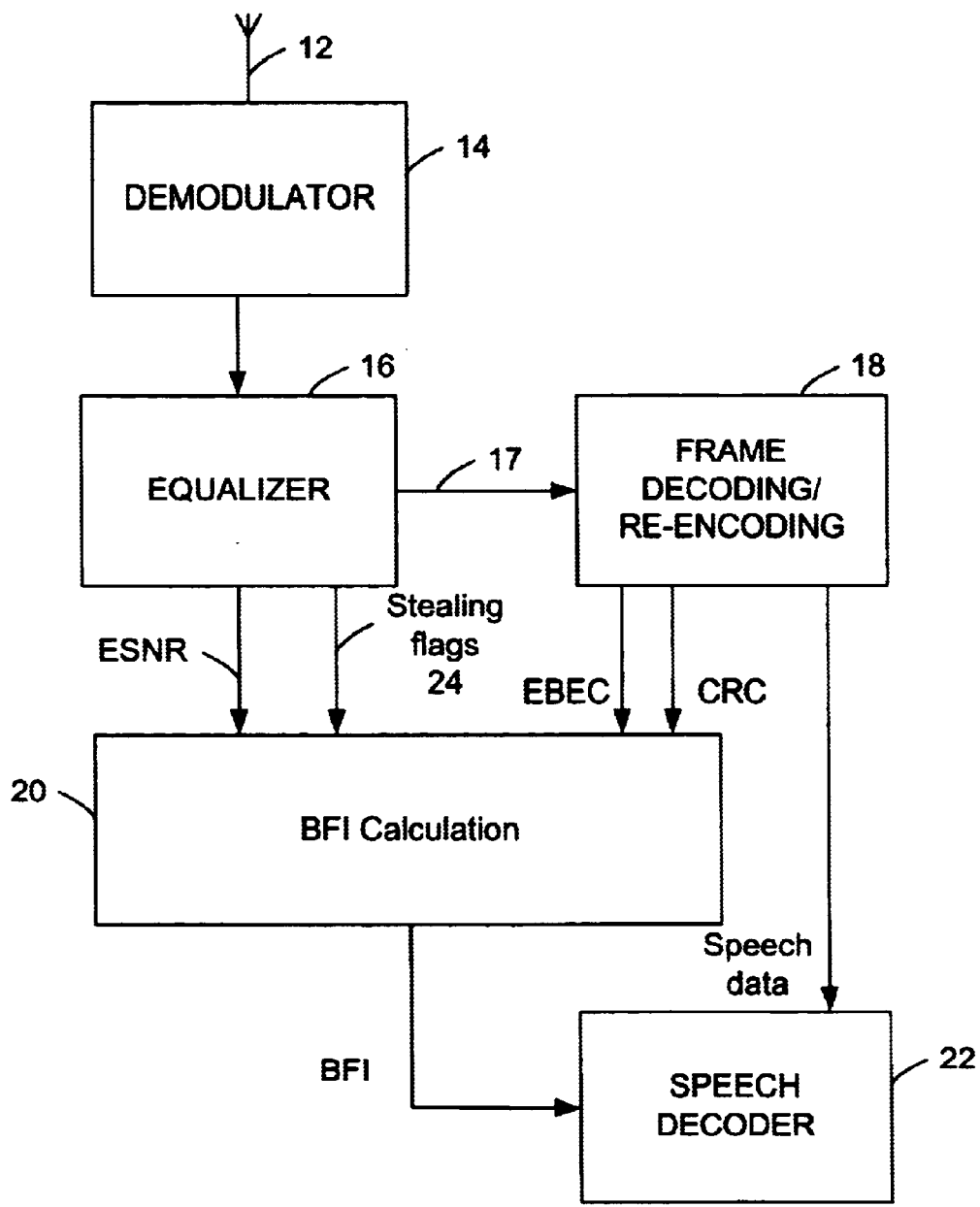
FIG. 1 is a block diagram of processing in a radio telephone receiver to obtain decoded speech data according to the invention.

FIG. 1 illustrates speech processing by a GSM radio telephone in accordance with the methodology for bad frame indication (BFI) calculation which is the object of the invention. The received radio signal is captured by an antenna 12 and passed to a demodulator 14. The demodulator converts the radio signal to a baseband digital signal. An equalizer 16 digitally processes the received baseband signal which is a sequence of GSM data bursts, termed normal bursts, containing speech data. The format of the normal burst 30 is shown in FIG. 2.

Figure 2:
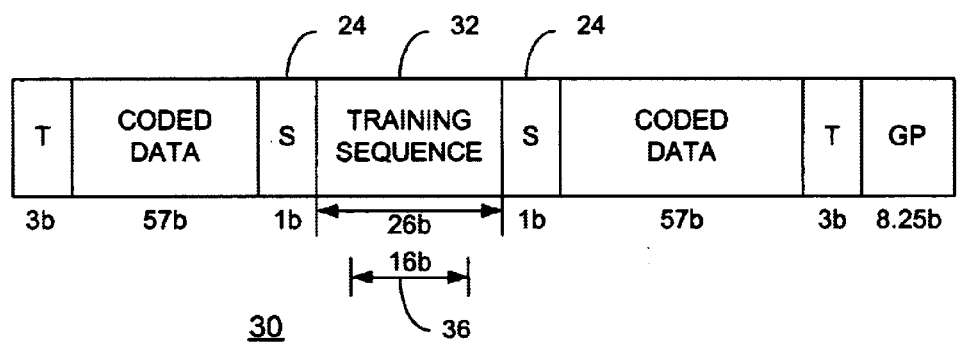
FIG. 2 is a diagram illustrating the data format of a GSM normal burst.
Figure 2B:
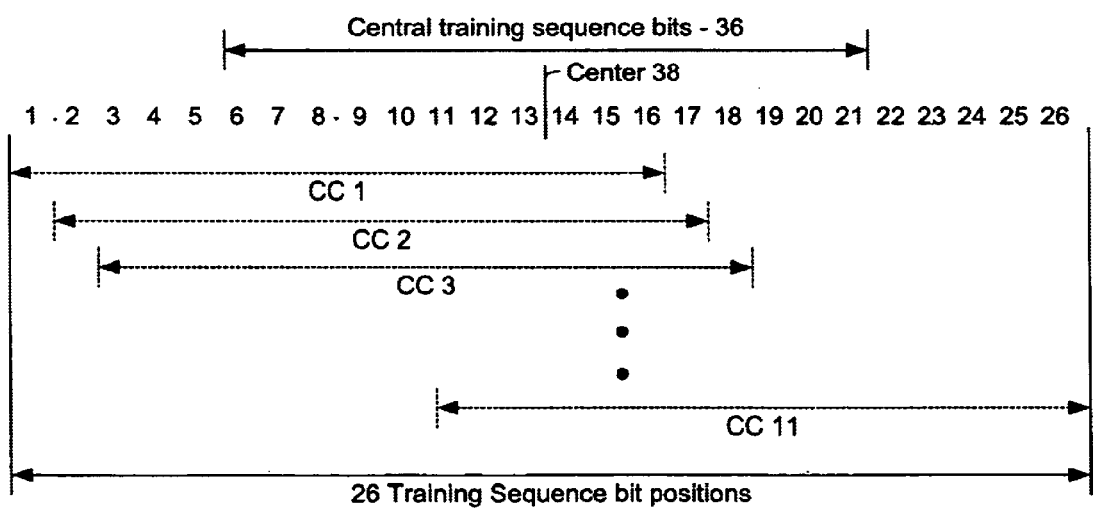
FIG. 2b illustrates the relationship between training sequence bits, local sequence bits and "sliding correlation" alignment.

With regard to FIG. 2 and FIG. 2b, to process a normal burst 30 the equalizer 16 first provides, generates, captures and/or stores in a shift register or equivalent a local 16-bit sequence 36, identical to the central 16 bits of the 26 bit training sequence 32 in the normal burst 30.

The equalizer 16 also provides J=11 16-bit sequences SEQ1, SEQ2–SEQJ–SEQ J selected from the training sequence bits 32. The sequences SEQ1, SEQ2–SEQj–SEQ11 are arranged so that selection is symmetrical with respect to the center of the 26 bit training sequence 32. This symmetrical arrangement may be made by selecting the first selected sequence SEQ1 starting with bit position 1 of the training sequence bits 32 in which each successive sequence SEQj+1 is shifted toward the last bit position 26 of the training sequence bits 32, from the previous selected sequence SEQJ by one bit position.

Referring again to FIG. 2b. The equalizer 16 then performs 1 <j <J separate correlations Ccj, where j is the integer ranging from 1 to eleven. Each correlation Ccj is performed between the local 16-bit sequence 36 and each one of eleven selected 16-bit sequences SEQ1, SEQ2–SEQj–SEQ 11. That is, the first correlation CC 1, is performed with the 16 training sequence bits ranging from training sequence bit position 1 to training sequence bit position 16. The second correlation CC 2, is performed with the 16 training sequence bits from bit position 2 to bit position 17, and so forth. The 11 th and last correlation Cc11 is performed using training sequence bit position is 11 through 26.

For every set of L correlations the absolute magnitude of L bits of each correlation are summed. The largest power sum is defined as the estimate of signal power. The L bits of the selected sum serve as an estimate of the channel impulse response. Next, the known training sequence is convolved with the estimated channel impulse response to obtain an estimate of the transmitted training sequence. An estimate of noise power is obtained by summing the magnitude squared of the difference between the received training sequence and the estimate of the transmitted training sequence. Then the ratio of estimated signal power and estimated noise power is denoted ESNR. A value of ESNR is computed for each burst and output to the BFI calculation 20. Additionally, the equalizer 16 performs its conventional function of processing the received burst 12 to mitigate inter-symbol interference and outputs a sequence of demodulation decisions 17 for the digital data bits of the burst to the frame decoding and re-encoding operation 18. The decisions 17 may be either hard-decision or soft-decision. The equalizer 16 also outputs stealing flags 24 of the burst 30 which are output to the BFI calculation 20. The stealing flags 24 are defined in FIG. 2. FIG. 2 shows the structure of a GSM normal burst which is used to carry user data such as digitally coded speech data. The user data occupies a portion of the burst, and the remainder of the bits is reserved for control and other purposes. In the burst 30, there are two bits termed stealing flag bits 24 and labeled S in FIG. 2. The stealing flags 24 are ordinarily set to value zero when the burst contains user data as is normally the case. However, there are times when the user data normally carried in the burst is pre-empted and the burst is "stolen" according to GSM specifications to carry signaling information. Setting the stealing flag 24 values to one indicates preempting of user data by control data. Therefore, the stealing flag 24 is an indication to the receiver processing whether the incoming burst is carrying user data or signaling data.

Under GSM specifications the user data from eight half-bursts comprise a speech frame. Therefore, there are eight stealing flags in each received speech frame.

Demodulated values of the stealing flags are −1 (hard-decision) or some negative value (−Vmax <Vsf<0, soft-decision) when the speech frame is transmitted. When the frame is stolen to send control information, the stealing flags have a value +1 (hard decision) or some positive value (0 <Vsf <+Vmax, soft decision). Importantly, all stealing flags have the same value in a frame at transmission so that summing the values of the received stealing flags of a frame creates a sum (SFsum) that contains information about the quality of the received frame of data.

Accordingly for BFI calculations a stealing flag metric |SFsum | equal to the absolute value of summation of the eight stealing flags is used in the invention as a novel metric for received signal quality. If either a speech frame or control frame was sent, the stealing flag metric typically has a large value. If nothing was sent as in the DTX mode, the stealing flag metric is typically less than a specified threshold value, and the current frame should be declared to be bad frame. Simulations verify that if the stealing flag metric is less than a given stealing flag threshold and the EBEC metric is less than an EBEC threshold then it is highly likely that the frame is bad because the receiver cannot distinguish whether speech was sent, signaling data was sent, or the burst is pure noise due to cessation of transmission during DTX mode. Occasionally, even with a small stealing flag metric, the frame may still be a good frame, and that exception is identified when the EBEC metric is larger than the EBEC threshold value.

Figure 3:
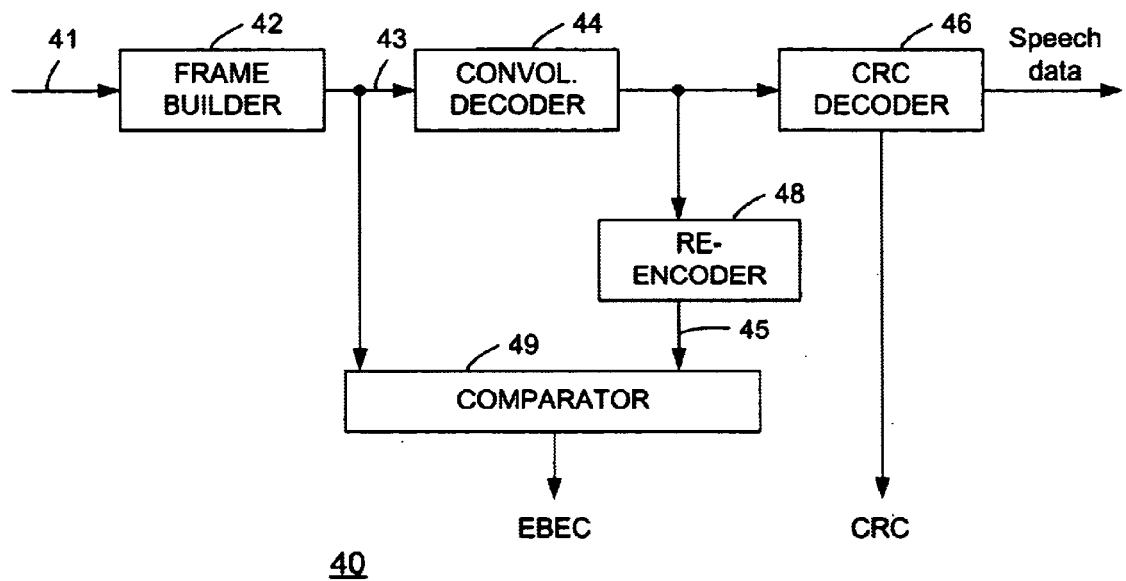
FIG. 3 is a block diagram describing the generation of estimated bit error count metric EBEC, and CRC flag.
Figure 4:
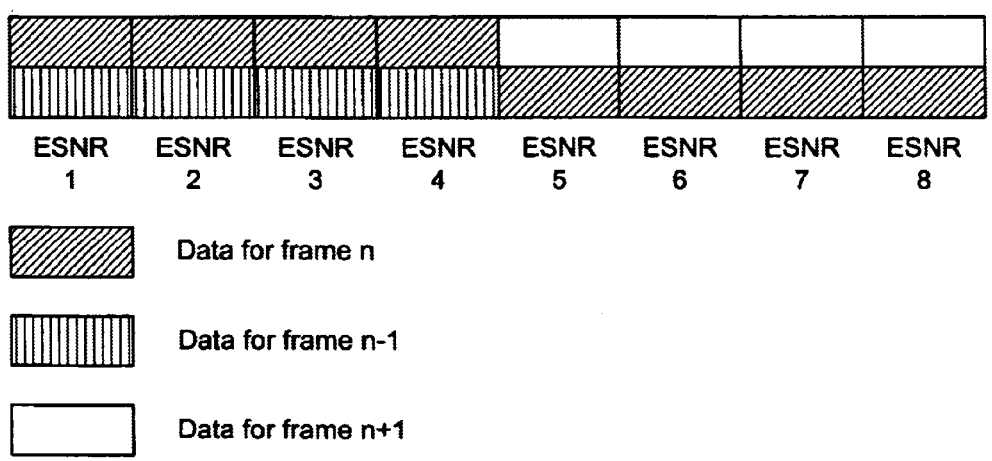
FIG. 4 is a diagram illustrating the GSM interleaving format of speech frames into eight consecutive data bursts.

FIG. 3 is a block diagram of the methodology 40 used to obtain estimated frame bit error count EBEC metric, and CRC flag. A coded speech frame comprises user data 41 from eight bursts and a frame builder 42 accordingly builds the frame of data 43. The coded speech frame is decoded by a convolutional decoder 44. The decoded data is re-encoded by a convolutional encoder 48 and the re-encoded data 45 is compared with the received data frame 43. The number of disagreements in the comparison constitutes the estimated bit error count EBEC for the frame. The decoded data also passes through the CRC decoder 46 and the CRC flag is output with value 1 if an error is detected and 0 if no error is detected. FIG. 4 shows the diagonal interleaving of speech data over eight bursts according to the GSM standard wherein bursts of the same shading belong to one coded frame. The upper tier of blocks represent even bits of a burst, and the lower tier of blocks represent odd bits of a burst. One coded speech frame is interleaved over 8 bursts. There is associated with each of the eight bursts an estimated signal to noise ratio (ESNR). So, one speech frame is corresponding to eight vaues of ESNR. If a certain number M of the first four or last four ESNRs is less than an ESNR threshold, the signal quality is poor and the speech frame is declared a bad frame. In the preferred embodiment M=3, and the ESNR threshold is 1.8 dB. Simulations show that other combinations are also satisfactory. For example an alternative criterion is to set BFI=1 if any six ESNRs are less than a threshold. In the invention, all signal quality metrics defined above are jointly used for BFI declaration as follows:

BFI=1 for a speech frame if any of the following three conditions are true: (1) CRC=1, i.e., error is detected by the CRC decoder (2) M ESNR values from the first four or last four bursts are less than x dB, where M=3 and threshold x=1.8 dB in the preferred embodiment. (3) The absolute value of the sum of the eight stealing flags of the frame is within the range [−y,y] and the bit error count EBEC >z, where threshold y=15 and threshold z=55 in the preferred embodiment. Otherwise, BFI=0.

In the preferred embodiment the stealing flag threshold values are for a four-bit soft decision variable, The joint BFI criterion of the invention methodology provides for an optimum tradeoff to meet opposing requirements for maximum bad frame indication rate and undetected bad frames rate as in the GSM standard.

ADDENDDUM

Estimated Signal-to-noise Ratio (ESNR) Calculation

Some form of Estimated signal-to-noise ratio (ESNR) calculation is commonly used as one metric component of a bad frame criterion. This is the case with the present invention. Typically the ESNR computation involves the computation of the sum of the squares of the inphase and quadrature components of the received signal of the received speech frame. This yields the average signal-plus-noise power which can be denoted (S+N). The average noise power N is then estimated and the ESNR is then computed by [(S+N)−N]/N. ESNR calculated in this way has low accuracy at low values of ESNR when the bad frame criterion needs to be particularly accurate. This is because (S+N) and N have almost the same value at low values of ESNR when the numerator of the computation approaches zero. This implies substantial sensitivity of the ESNR computation to estimation error and the ESNR value can even take on a negative value which is meaningless for power ratios. Estimation errors can be large for the kinds of severe multipath conditions encountered by mobile communication systems such as GSM. As presently described the present invention utilizes ESNR computation that is more accurate at low values of ESNR and never takes on negative values.

For communications in severe multipath as in the GSM system, receivers are commonly equipped with nearly optimal equalizers known as maximum likelihood sequence estimators (MLSE) to mitigate distortion of the received waveform in the form of intersymbol interfererence. The MLSE performance in demodulating data is characterized by the number of bit errors that appear in a received speech frame and is therefore related to the statistics of the occurrence of bad frames. The MLSE demodulation bit errors are caused not only by thermal noise in the receiver, but also by equalizer-induced distortions such as errors in estimation of the multipath channel impulse response which is used by the MLSE for data demodulation. A general backgroun for MLSE and terminology used in this disclosure can be found in the reference [Steele, Raymond, "Mobile Radio Communications", Chapter 6, Pentech Press, 1992]. The ESNR calculation of the present invention includes the equalizer distortion effects with thermal noise in the noise power estimation. Thus, the equalizer distortion effects are also reflected in the ESNR metric for bad frame criterion; this is an advantageous feature of the present invention since the equalizer distortion also contributes to bit errors and hence to occurrence of bad frames.

FIG. A-1 shows a block diagram of a radio receiver 10 for a burst digital communication system such as GSM which operates in a multipath radio propagation environment and which includes the method of the invention for ESNR computation. A downconverter 20 with an antenna receives a radio frequency burst communication signal 21 from a multipath radio communication channel not shown in the figure. The received radio burst contains digitally modulated data. As an example, in the preferred embodiment the received data burst is a GSM burst with the data format shown in FIG. 2. As an example the receiver may be a cellular radiotelephone receiver and the remote transmitter a base station that transmits bursts of data to a plurality of such receivers 10 in assigned time slots of a time-division multiple access (TDMA) transmission discipline. The downconverter 20 converts the received radio burst frequency down to complex form 22 (inphase and quadrature signal components) at baseband frequency. The complex signal 22 is then converted to a digital complex sample stream 25 by a pair of analog-to-digital converters (ADC) 24. The ADC 24 is clocked to provide one inphase and one quadrature sample, or one complex sample, per symbol in the received baseband burst 25. The invention is not confined to a single complex sample per symbol and extension to multiple samples per symbol are possible. The sample capture device 26 provides for storage of a set of complex baseband digital data samples 28 of the received burst 21 for further digital processing by a processor 99, preferably a general purpose DSP. The remaining functions to be described are implemented in DSP signal processing, where the DSP functions are circumscribed by the dashed lines in FIG. A-1. The program memory and data memory resides in local memory in 98 of the processor 99. A timebase 80 which is a local clock that maintains TDMA frame timing indicates to the sample capture device when to start and end collection of ADC samples such that samples of the entire received burst 21 is captured in the storage device 26.

For illustrative purposes for the ensuing description of the invention the basic format of the burst data 100 of the GSM international cellular phone standard [European Telecommunication Standard GSM5.02] shown in FIG. A-2 shall be assumed. Starting from the center the burst comprises a midamble of twenty-six training sequence bits, fifty-seven data bits on both sides of the midamble, one stealing flag outside the data bits front and back, and three tail bits outside the stealing flags front and back for burst transitions. The detailed view of the midamble shows that the inner sixteen bits b0, b1, . . . , b16 constitute a correlation word 102 which is for the case of GSM continued periodically five bits before and after the inner sixteen bits. That is, the first five bits of correlation word are appended to the end of the correlation word and the final five bits of the correlation word are prefixed to the front of the correlation word to comprise the midamble. As presently described the correlation word for the GSM midamble serves a local correlation sequence for cross correlation with the received midamble. The correlation word was selected for the GSM standards to provide good cross correlation characteristics, specifically a correlation peak of 16 and correlation sidelobes of 0 over a cross-correlation range of +/−5 shifts. For correlation shifts outside that range the sidelobes progressively deteriorate (worst-case sidelobe increases) as the cross correlation extends into the data portion of the received burst. The purpose of time tracking is to maintain alignment of the midamble of the received burst with the local correlation sequence so that cross correlation does not extend too far into the data region of the burst. For systems other than GSM, the characteristics are similar in that the preamble or midamble is selected to give good peak-to-sidelobe cross correlation characteristics.

In FIG. A-1 the processor 99 includes a set of signal processing functions including a sample demultiplexer 29, a time tracker 50, a channel estimator 30, an MLSE equalizer 48, and a tapped delay line filter 70. The Demultiplexer 29 inputs the burst samples 28 and demultiplexes the data samples 31 of the burst and the midamble samples 33. The data samples go to the MLSE equalizer. The midamble samples go to the channel estimator, tapped delay line filter, and time tracker. The MLSE equalizer outputs demodulated data 37. The time tracker 50 operates on the midamble samples 33 to generate a tracking loop feedback correction 52 to the timebase 80. The timebase response to the feedback corrections 52 track out the burst arrival time errors, thereby maintaining synchronization of the receiver 10 with received data bursts.

As presently described, the channel estimator performs cross correlations of the received midamble with a local correlation sequence to generate an estimate of channel impulse response h(n) 35, n=0, 1, 2, . . . , L−1, where L is the multipath delay spread. The impulse response 35 is utilized by the MLSE equalizer 48, and transversal filter 70. The equalizer 48 utilizes the estimated channel impulse response 35 to generate demodulated data 37 of the received burst. The preceding functions of the receiver entail conventional signal processing as for example described in the reference [Steele (op. cit)].

For the GSM burst format of FIG. A-2, the calculation of the channel impulse response 35 by the channel estimator 30 is illustrated with the aid of FIG. A-3. The channel estimator inputs both the complex received midamble 33 and the local correlation word 102. The local correlation word 102 is correlated with the received midamble 33, and the position of local correlation word relative to the received midamble for the first correlation shift is labeled 202. Then the local correlation word is shifted one bit to the right, and the correlation repeated over the shifted correlation interval, and so on. The shift-and-correlate operation is repeated successively until the local correlation word has been shifted over the correlation search window 210. The timing of the received midamble 33 relative to the search window as shown in FIG. A-3 is for the case when frame synchronization error is zero, i.e., the burst time of arrival error is zero. Generally a nonzero time of arrival error is possible and it is the purpose of the time tracker 50 to drive the error to zero. For a burst with zero time-of-arrival error, there is one correlation position 204 which aligns exactly with the correlation word or middle 16 bits in the received midamble, and the correlation value for this center correlation shift position is denoted $C_0$. For the correlation interval shifted one symbol right of the center position the correlation value is denoted $C_1$, and two symbols right $C_2$, one symbol left of center $C_{-1}$, two symbols left of center $C_{-2}$, and so forth. If the received burst has zero time of arrival error, then it is known to those skilled in the art that the correlation values $C_0, C_1, \ldots C_{L-1}$ represents the channel impulse response for a multipath channel with multipath delay spread of L symbols or samples. The energy of the channel impulse response for that case is given by $S_0 = |C_0|^2 + |C_1|^2 + \ldots + |C_{N-1}|^2$. Since the actual time alignment of the received burst relative to the search window is unknown the channel estimator computes the energies for all possible positions of channel impulse responses over the correlation window. In general the energy of the k-th impulse response is $S_k = |C_k|^2 + |C_{k+1}|^2 + \ldots + |C_{k+L-1}|^2$ for an assumed multipath spread of L symbols. In reality multipath spread is random and dependent on propagation terrain type so that the maximum value of multipath spread L is typically assumed. As an example, for an assumed multipath delay spread of L=5 symbols, and correlations over the search window of 13 correlations $C_{-6}$, $C_{-5}, \ldots C_0 \ldots C_5, C_6$, there are nine possible channel impulse responses with energies $S_{-6}, S_{-5} \ldots S_0, S_1, S_2$. The measured channel impulse response of the received burst according to the methodology starts at correlation index k in the search window if $S_k$ has the maximum energy; that is, the complex channel impulse response is given by complex correlation values $C_k, C_{k+1}, \ldots, C_{k+L-1}$. The channel impulse response 35 is passed to the equalizer 48 and transversal filter 70, and the maximum energy $S_k$ 81 is sent to the ESNR calculation 82.

The estimated channel impulse response complex values Cn, n=k, k+1 . . . ,k+L−1 35 are used as tap gain values in the complex tap delay line filter 70 so that the filter models the actual multipath channel. The known midamble modulated data 73 is passed through the complex tapped delay line filter 70 to obtain a reconstructed version of the complex midamble signal (excluding noise) 74 that is embedded in the received midamble samples 33. The adder 76 computes the complex difference of the received midamble samples 33 and estimated midamble signal 74. The resultant complex error sequence $N_k$, k=(1,2, . . . ,16) 78 represents an estimate of the complex noise which comprises thermal noise as well as equalizer distortion of the signal.

The ESNR calculation 82 computes the burst ESNR value 83 from the complex noise sequence $N_k$, k=(1,2, . . . ,16) 78 and signal energy $S_k$ 81 as follows:

$$ESNR = \frac{S_k}{\sum_{1}^{16} |n_k|^2}$$

The value ESNR is computed and sent to the BFI calculation 84 for the eight bursts comprising a speech frame to support BFI calculation for the speech frame

I claim:
1. In a radio communication system, a method for operating a receiver to determine that a received speech frame is bad, the method comprising:

receiving a plurality of bursts that make up the speech frame, wherein each of the plurality of bursts includes coded speech data and a received training sequence;

for each of the plurality of bursts:

performing a plurality of correlation operations on a respective received training sequence using a local sequence to produce a plurality of correlation sequences, each correlation sequence including a plurality of correlation values and being respective to a contiguous portion of the training sequence;

separately summing the correlation values of the correlation sequences to produce a plurality of sums;

based upon a maximum one of the plurality of sums determining an estimated signal power;

determining an estimated noise power based upon the received training sequence; and based upon the estimated signal power and the estimated noise power, determining an estimated signal-to-noise ratio (ESNR) for the respective burst; and when the ESNR of the plurality of bursts compare unfavorably to an ESNR criteria, determining that the speech frame is bad.

2. The method of claim 1, wherein separately summing the correlation values of each correlation sequence to produce a plurality of sums comprises separately summing absolute values of the correlation values of the correlation sequences.

3. The method of claim 1, wherein:

each training sequence includes 26 symbols;

each correlation sequence includes 16 symbols; and each of the plurality of correlation sequences includes 11 correlation values.

4. The method of claim 1, wherein:

each training sequence includes 26 bits;

each correlation sequence includes 16 bits; and each of the plurality of correlation sequences includes 11 correlation values.

5. The method of claim 1, wherein based upon at least one of the plurality of correlation sequences, determining an estimated noise power comprises:

selecting a correlation sequence of the plurality of correlation sequences having a maximum summation as an estimated channel impulse response;

convolving the estimated channel impulse response with a local training sequence to produce an estimated transmitted training sequence;

performing a power summation of the difference between the estimated transmitted training sequence and the respective received training sequence to produce the estimated noise power.

6. The method of claim 1, wherein when the ESNR of the plurality of bursts compare unfavorably to an ESNR criteria, determining that the speech frame is bad comprises when any M ESNRs corresponding to the speech frame are less than a predetermined SNR threshold, determining that the speech frame is bad, wherein M is a positive integer.

7. The method of claim 1, wherein when the ESNR of the plurality of bursts compare unfavorably to an ESNR criteria, determining that the speech frame is bad comprises:

when any M ESNRs of the first N bursts corresponding to the speech frame are less than a predetermined SNR threshold, determining that the speech frame is bad, wherein M is a positive integer, N is a positive integer and M is less than N; and when any M ESNRs of the last N bursts corresponding to the speech frame are less than a predetermined SNR threshold, determining that the speech frame is bad.

8. In a radio communication system, a method for operating a receiver to determine that a received speech frame is bad, the method comprising:

receiving a plurality of bursts that make up the speech frame, wherein the plurality of bursts includes a data portion, at least one stealing flag, and a received training sequence, wherein a stealing flag indicates whether coded speech data in a data portion of a respective burst has been preempted with control data;

determining an absolute value of the sum of the stealing flags contained in the plurality of bursts;

determining an estimated bit error count (EBEC) for the speech frame based upon the plurality of bursts; and when the absolute value of the sum of the stealing flags contained in the plurality of bursts compares unfavorably to a first threshold and the EBEC for the speech frame compares unfavorably to a second threshold, determining that the speech frame is bad.

9. The method of claim 8, further comprising when a Cyclical Redundancy Check (CRC) corresponding to the speech frame indicates a parity failure, determining that the speech frame is bad.

10. The method of claim 8, further comprising:

for each of the plurality of bursts:

performing a plurality of correlation operations on a respective received training sequence to produce a plurality of correlation sequences, each of correlation sequence including a plurality of correlation values;

based upon at least one of the plurality of correlation sequences, determining an estimated signal power;

based upon at least one of the plurality of correlation sequences, determining an estimated noise power; and based upon the estimated signal power and the estimated noise power, determining an estimated signal-to-noise ratio (ESNR) for the respective burst; and when the ESNR of the plurality of bursts compare unfavorably to an ESNR criteria, determining that the speech frame is bad.

11. The method of claim 10, wherein based upon at least one of the plurality of correlation sequences, determining an estimated signal power comprises:

performing a power summation on each of the plurality of correlation sequences to produce a plurality of power summations; and selecting a maximum power sum of the plurality of power summations as the estimated signal power.

12. The method of claim 10, wherein based upon at least one of the plurality of correlation sequences, determining an estimated noise power comprises:

selecting a correlation sequence of the plurality of correlation sequences having a maximum summation as an estimated channel impulse response;

convolving the estimated channel impulse response with a local training sequence to produce an estimated transmitted training sequence;

performing a power summation of the difference between the estimated transmitted training sequence and the respective received training sequence to produce the estimated noise power.

13. The method of claim 10, wherein when the ESNR of the plurality of bursts compare unfavorably to an ESNR criteria, determining that the speech frame is bad comprises when any M ESNRs corresponding to the speech frame are less than a predetermined SNR threshold, determining that the speech frame is bad, wherein M is a positive integer.

14. The method of claim 10, wherein when the ESNR of the plurality of bursts compare unfavorably to an ESNR criteria, determining that the speech frame is bad comprises:
when any M ESNRs of the first N bursts corresponding to the speech frame are less than a predetermined SNR threshold, determining that the speech frame is bad, wherein M is a positive integer, N is a positive integer and M is less than N; and
when any M ESNRs of the last N bursts corresponding to the speech frame are less than a predetermined SNR threshold, determining that the speech frame is bad.

15. The method of claim 8, wherein determining an estimated bit error count (EBEC) for the speech frame based upon the plurality of bursts comprises:
decoding the coded speech data of the plurality of bursts to produce decoded speech data;
recoding the decoded speech data to produce re-encoded speech data;
comparing the re-encoded speech data to the coded speech data; and
wherein a number of disagreements between the re-encoded speech data and the coded speech data is the EBEC.

16. In a radio communication system, a method for operating a receiver to determine that a received speech frame is bad, the method comprising:
receiving a plurality of bursts that make up the speech frame, wherein the plurality of bursts includes a data portion, at least one stealing flag, and a received training sequence, wherein a stealing flag indicates whether coded speech data in a data portion of a respective burst has been preempted with control data;
determining an estimated signal-to-noise ratio (ESNR) for each of the plurality of bursts;
determining an absolute value of the sum of the stealing flags contained in the plurality of bursts;
determining an estimated bit error count (EBEC) for the speech frame based upon the plurality of bursts;
when the absolute value of the sum of the stealing flags contained in the plurality of bursts compares unfavorably to a first threshold and the EBEC for the speech frame compares unfavorably to a second threshold, determining that the speech frame is bad; and
when the ESNR of the plurality of bursts compare unfavorably to an ESNR criteria, determining that the speech frame is bad.

17. The method of claim 16, further comprising when a Cyclical Redundancy Check (CRC) corresponding to the speech frame indicates a parity failure, determining that the speech frame is bad.

18. The method of claim 16, wherein when the ESNR of the plurality of bursts compare unfavorably to an ESNR criteria, determining that the speech frame is bad comprises when any M ESNRs corresponding to the speech frame are less than a predetermined SNR threshold, determining that the speech frame is bad, wherein M is a positive integer.

19. The method of claim 16, wherein when the ESNR of the plurality of bursts compare unfavorably to an ESNR criteria, determining that the speech frame is bad comprises:
when any M ESNRs of the first N bursts corresponding to the speech frame are less than a predetermined SNR threshold, determining that the speech frame is bad, wherein M is a positive integer, N is a positive integer and M is less than N; and
when any M ESNRs of the last N bursts corresponding to the speech frame are less than a predetermined SNR threshold, determining that the speech frame is bad.

20. The method of claim 16, wherein determining an estimated bit error count (EBEC) for the speech frame based upon the plurality of bursts comprises:
decoding the coded speech data of the plurality of bursts to produce decoded speech data;
recoding the decoded speech data to produce re-encoded speech data;
comparing the re-encoded speech data to the coded speech data; and
wherein a number of disagreements between the re-encoded speech data and the coded speech data is the EBEC.

* * * * *